United States Patent

Levers

[11] Patent Number: 5,237,249
[45] Date of Patent: Aug. 17, 1993

[54] APPARATUS FOR CONTROLLING A WINDSCREEN WIPING SYSTEM

[75] Inventor: Juergen Levers, Bochum, Fed. Rep. of Germany

[73] Assignee: Leopold Kostal GmbH & Co., Ludenscheid, Fed. Rep. of Germany

[21] Appl. No.: 902,384

[22] Filed: Jun. 23, 1992

Related U.S. Application Data

[63] Continuation-in-part of Ser. No. 899,768, Jun. 17, 1992, Pat. No. 5,227,705.

[30] Foreign Application Priority Data

May 26, 1992 [DE] Fed. Rep. of Germany ....... 4217390

[51] Int. Cl.$^5$ .................................................. B60S 1/08
[52] U.S. Cl. .................................. 318/443; 318/480; 318/DIG. 2
[58] Field of Search ............... 318/480, 483, 443, 444, 318/DIG. 2; 15/250.12, 250.17; 307/9.1, 10.1

[56] References Cited

U.S. PATENT DOCUMENTS

| | | | |
|---|---|---|---|
| 3,947,131 | 3/1976 | Karl | 356/209 |
| 4,355,271 | 10/1982 | Noack | 318/480 |
| 4,481,450 | 11/1984 | Watanabe et al. | 318/444 |
| 4,636,664 | 1/1987 | Nakamura et al. | 350/341 |
| 4,798,956 | 1/1989 | Hochstein | 250/338 |
| 4,859,867 | 8/1989 | Larson et al. | 307/10.1 |
| 4,867,561 | 9/1989 | Fujii et al. | 356/237 |
| 4,916,374 | 4/1990 | Schierbeek et al. | 318/483 |
| 4,956,691 | 9/1990 | Schierbeek et al. | 318/483 |
| 4,960,996 | 10/1990 | Hochstein | 250/349 |
| 5,015,931 | 5/1991 | Muller | 318/483 |
| 5,059,877 | 10/1991 | Teder | 318/444 |

FOREIGN PATENT DOCUMENTS

3314770 2/1990 Fed. Rep. of Germany.
3923281 1/1991 Fed. Rep. of Germany.
4036407 5/1992 Fed. Rep. of Germany.

Primary Examiner—Bentsu Ro
Attorney, Agent, or Firm—Brooks & Kushman

[57] ABSTRACT

Apparatus is provided for controlling a windscreen wiping system. The apparatus includes a circuit arrangement which includes a microcontroller, a clock generator unit comprising a switch and a clock-pulse generator, an I/V converter, a phase-selective rectifier and an amplifier with a low-pass characteristic. The apparatus also includes an optoelectronic apparatus having IR beam transmitters for transmitting useful signals in clocked form and IR beam receivers for receiving the transmitted useful signals. The IR beams which are transmitted are influenced between the IR beam transmitters and the IR beam receivers by a liquid or solid coating on the screen, such that the signals received by IR beam receivers are varied in dependence upon the coating present on the screen. The amplifier filters out the interference quantities of the ambient light to obtain a processed useful signal. The signal received by the IR beam receivers are converted by the circuit arrangement into control signals by means of which operation of the drive motor is controlled. The IR beam receivers are provided with at least one load resistor, and the voltage drop at the at least one load resistor caused by rapid changes in the ambient light received by the IR beam receivers is used as a correcting quantity for the useful signal to eliminate influences of ambient light, thereby preventing unwanted triggering of the windscreen wiping system.

3 Claims, 2 Drawing Sheets

APPARATUS FOR CONTROLLING A WINDSCREEN WIPING SYSTEM

CROSS-REFERENCE TO RELATED APPLICATION

This application is a continuation-in-part of U.S. patent application Ser. No. 07/899,768, titled "Device For Controlling A Windscreen Wiping System" filed on Jun. 17, 1992 and issued as U.S. Pat. No. 5,227,705, the specification of which is hereby expressly incorporated by reference in its entirety.

TECHNICAL FIELD

The present invention relates to an apparatus for detecting the quality and quantity of a liquid or solid coating present on the front or rear windscreen of a motor vehicle and, in dependence thereon, automatically influencing a windscreen wiping system associated with the screen, i.e. to set said system into, in particular, intermittent operation for the purpose of cleaning the screen.

BACKGROUND ART

A device for controlling a windscreen wiper motor has become known from DE 33 14 770 C2, which discloses an IR optoelectronic apparatus and a circuit arrangement having an I/V converter, a phase-selective rectifier and a low-pass filter. Because the IR beam receivers in dependence upon the prevailing ambient light conditions each receive, in addition to the IR useful signal emitted by the beam transmitters, an infrared light fraction of the ambient light, the fraction of the ambient light is decoupled from the total signal to provide a signal which is basically capable of further processing. Decoupling of the IR ambient light fraction from the total signal is effected by a phase-selective rectifier or by capacitive decoupling. However, this does not decouple all of the influences of the ambient light which have a disturbing effect upon the useful signal.

The above-referenced co-pending patent application discloses a device for controlling a windscreen wiping system which automatically adjusts even to extremely varying measuring conditions, in particular, to the varying damping factors of different screen types. Operation of these existing systems, however, may be influenced by other disturbing influences of the ambient light which adversely affects evaluation of the IR useful signal.

SUMMARY OF THE INVENTION

It is an object of the present invention to provide an apparatus for controlling a windscreen wiping system wherein not only is the IR light fraction corresponding to the ambient light intensity to be decoupled from the useful signal, but also other disturbing influences of the ambient light which adversely affect evaluation of the IR useful signal are to be eliminated.

The foregoing object is achieved according to the invention by the features indicated in the defining part of the main claim. Thus, an apparatus is provided for controlling a windscreen wiping system having a drive motor for at least one windscreen wiper arm for cleaning the outer surface of a screen. The apparatus has an optoelectronic apparatus disposed in the wiped area on the inner surface of the screen and comprises at least one IR beam transmitter for transmitting useful signals in clocked form and at least one IR beam receiver for receiving the transmitted useful signals. The IR beams which are transmitted are influenced between the at least one IR beam transmitter and the at least one IR beam receiver by a liquid or solid coating on the screen, such that the signals received by the at least one IR beam receiver are varied in dependence upon the coating present on the screen. The apparatus also comprises a circuit arrangement, connected to the optoelectronic apparatus and the drive motor, including at least one I/V converter for amplifying an alternating component of the received signals and generating an output signal, a phase-selective rectifier for narrowband filtering and rectifying the clocked component of the output signal of the I/V converter, and an amplifier having a low-pass characteristic for filtering out the interference quantities of the ambient light to obtain a processed useful signal. The circuit arrangement also includes a microcontroller having a basic setting value, which is determined by the optoelectronic apparatus when the screen is optimally clean, which represents the quasi-static conditions of the components provided for detecting the coating present on the screen and being stored in a non-volatile memory. Preferably, the basic setting value is used as a starting value for all subsequent start-ups of the windscreen wiping system. The received signals are converted by the circuit arrangement into control signals by means of which operation of the drive motor is controlled, wherein the at least one IR beam receiver is provided with at least one load resistor. The voltage drop at the at least one load resistor caused by rapid changes in the ambient light received by the at least one beam receiver is used as a correcting quantity for the useful signal to eliminate influences of ambient light, thereby preventing unwanted triggering of the windscreen wiping system.

The advantages accruing to the present invention over existing devices are numerous. For example, even ambient light conditions that are changing continuously in very rapid succession, e.g. from light to dark, do not lead to unwanted triggering of the windscreen wiping system or prevent desired triggering of the windscreen wiping system.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
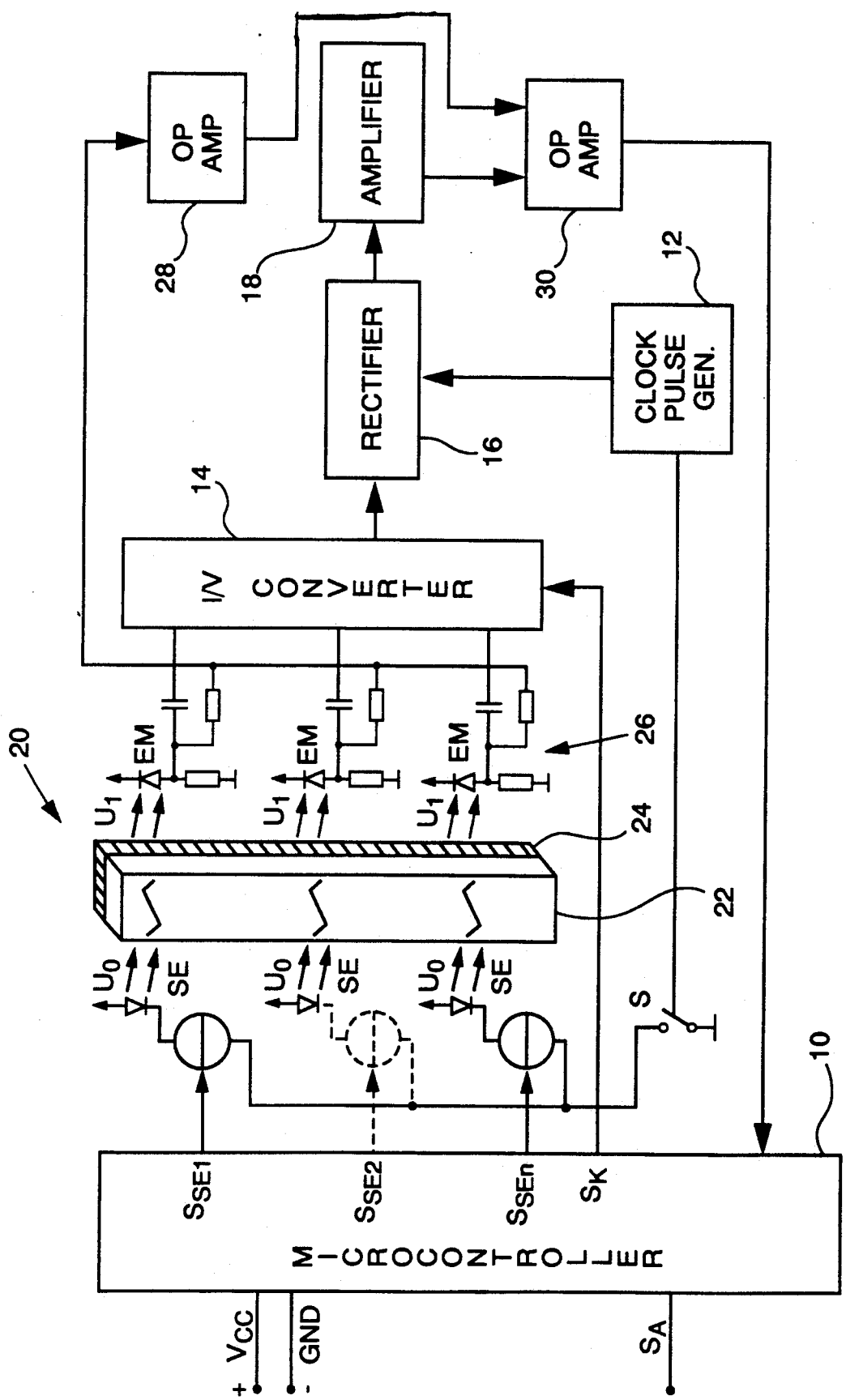
FIG. 1 is a block diagram of the apparatus for controlling the windscreen wiping system of the present invention.

Referring now to FIG. 1, there is shown a block diagram for an apparatus for controlling a windscreen wiping system which includes a microcontroller 10, a clock generator unit comprising a switch S and a clock-pulse generator 12, an I/V converter 14, a phase-selective rectifier 16 and an amplifier 18 with a low-pass characteristic, as well as an optoelectronic apparatus 20 having a plurality of IR beam transmitters SE, a beam guide element 22 and a plurality of beam receivers EM.

A respective IR beam receiver EM on the output side is preferably associated with each IR beam transmitter SE on the input side.

The microcontroller 10 of the circuit arrangement is connected on the one hand via its inputs $V_{CC}$ and GND to a power supply and on the other hand via its control output SA to the windscreen wiping system of a motor vehicle. Moreover, the transmitting current of the IR beam transmitters SE is set via the control outputs $S_{SEI}$ to $S_{SEN}$ of microcontroller 10 and the conversion factor of the I/V converter 14 is set via the control output SK.

The IR beam transmitters SE of the optoelectronic apparatus 20 are operated in a pulse control manner with a current of >2 KHz frequency. This modulation gives rise to a useful signal in the form of an alternating signal which, for evaluation of the conditions existing on the screen 24, is supplied to the IR beam receivers EM via the beam guide element 22. However, in addition to the actual useful signal, the IR beam receivers EM also receive the infrared light fractions of the ambient light. These infrared light fractions constitute a current superimposed on the useful signal. By means of known arrangements such as, for example, phase-selective rectifiers 16, capacitive decoupling and the like, the superimposed current may be removed from the useful signal. However, this by no means eliminates all the influences of the ambient light which have a disturbing effect upon the useful signal.

Figure 2:
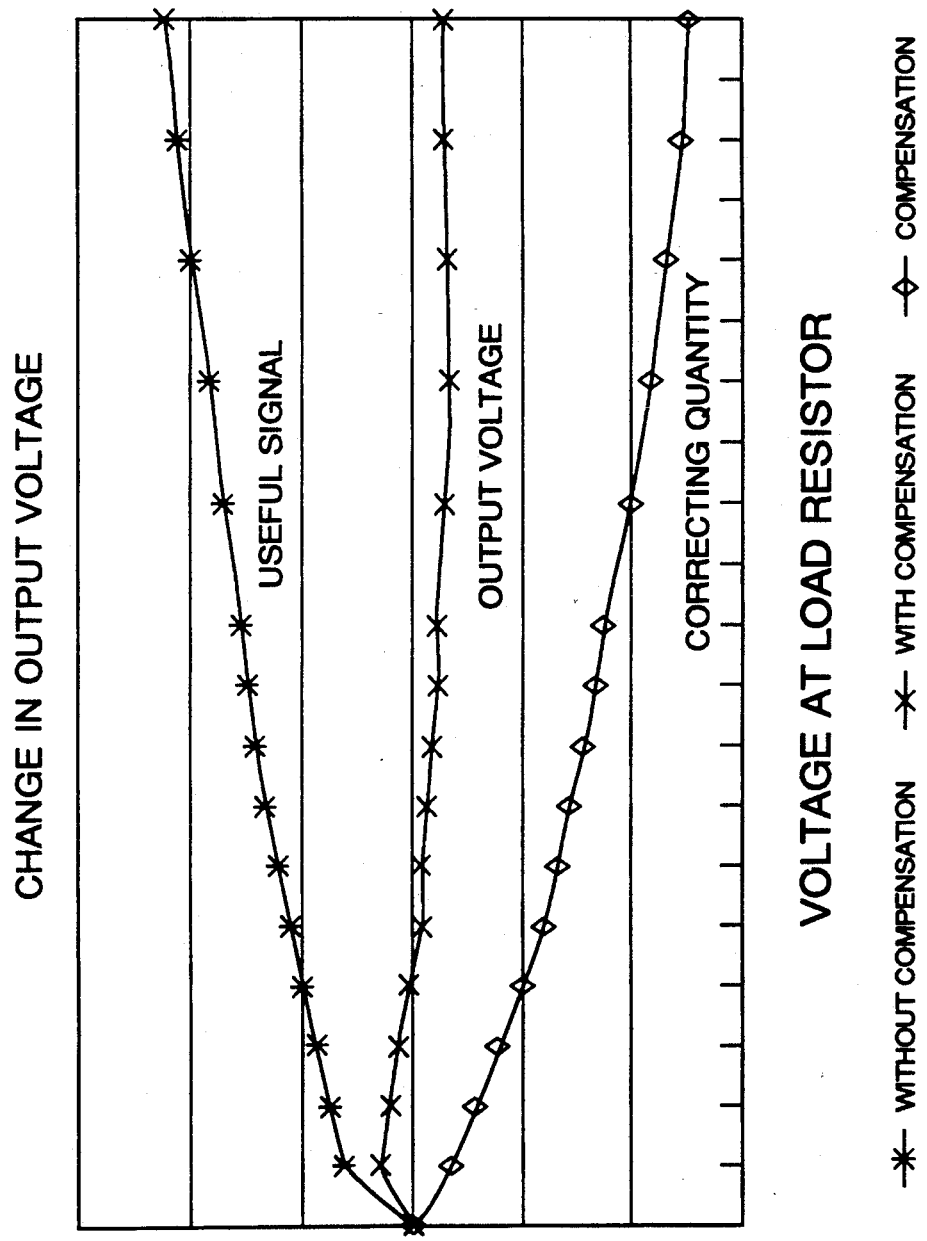
FIG. 2 is a graph illustrating the useful signal, output voltage and correcting quantity.

As is apparent, particularly from FIG. 2, the IR beam receivers EM have a non-linear characteristic. If the output of the IR beam transmitters SE is held constant, this necessarily results in non-linearity of the useful signal of the IR beam receivers EM when differing ambient light conditions prevail.

As a result of the unwanted influences of the ambient light, continuous rapid changes in ambient light conditions, such as that which occur, for example, when driving along a tree-lined road (interplay of light and dark), may in particular lead to effects in the optoelectronic apparatus 20, which result in unwanted triggering of the windscreen wiping system. To eliminate these unwanted ambient light influences upon the optoelectronic apparatus 20, the voltage drop at the load resistors 26 of the IR beam receivers EM is used as a correcting quantity for operation of the windscreen wiping system. This correction is also used, for example, to prevent the output voltage from sliding, as a result of ambient light influences, below a so-called interference level of the sensor apparatus. The interference level represents the threshold, beyond which in all probability signal changes are to be evaluated as a coating present on the screen 24. Linearization of the useful signal (formation of the output voltage) is achieved in particular by associating a first operational amplifier 28 with the IR beam receiver EM for the purpose of processing the voltage drop at the load resistor 26 into a correcting quantity.

With continuing reference to FIG. 1, there is provided, downstream of the amplifier 18 with a low-pass characteristic, a second operational amplifier 30, to which are supplied, as input quantities, the useful signal lying downstream of the amplifier 18 with a low-pass characteristic on the one hand, and the processed correcting quantity on the other hand. In the preferred embodiment, the second operational amplifier 30 eliminates the variations in the useful signal caused by the ambient light by injecting the correcting quantity, thereby resulting in the formation of the output voltage to be read into the microcontroller 10. An output voltage, which has been linearized by the correcting quantity, therefore lies downstream of the operational amplifier 30. Influences upon the useful signal which originate from the ambient light are, therefore, effectively eliminated.

While the best mode for carrying out the invention has been described in detail, those familiar with the art to which this invention relates will recognize various alternative designs and embodiments for practicing the invention as defined by the following claims.

What is claimed:

1. Apparatus for controlling a windscreen wiping system having a drive motor for driving at least one windscreen wiper arm for cleaning the outer surface of a screen, the apparatus having an optoelectronic device disposed in the wiped area on the inner surface of the screen, the apparatus comprising:

the optoelectronic device including at least one IR beam transmitter for transmitting useful signals in clocked form and at least one IR beam receiver for receiving the transmitted useful signals, the IR beams which are transmitted being influenced between the at least one IR beam transmitter and the at least one IR beam receiver by a liquid or solid coating on the screen, such that the signals received by the at least one IR beam receiver are varied in dependence upon the coating present on the screen; and a circuit arrangement, connected to the optoelectronic device and the drive motor, including at least one I/V converter for amplifying an alternating component of the received signals and generating an output signal, a phase-selective rectifier for narrow-band filtering and rectifying a clocked component of the output signal of the I/V converter, and an amplifier having a low-pass characteristic for filtering out the interference quantities of the ambient light to obtain a processed useful signal, the circuit arrangement of the windscreen wiping system also including a microcontroller having a basic setting value which is determined by the optoelectronic device when the screen is optimally clean, the basic setting value representing the quasi-static conditions of the components provided for detecting the coating present on the screen and being stored in a non-volatile memory, the basic setting value big used as a starting value for all subsequent startups of the windscreen wiping system, said received signals being converted by the circuit arrangement into control signals by means of which operation of the drive motor is controlled, wherein the at least one IR beam receiver is provided with at least one load resistor, and the voltage drop at the at least one load resistor caused by rapid changes in the ambient light received by the at least one beam receiver is used as a correcting quantity for the useful signal to eliminate influences of ambient light, thereby preventing unwanted triggering of the windscreen wiping system.

2. The apparatus of claim 1, wherein the correcting quantity and the processed useful signal are supplied to the microcontroller, the microcontroller generating the control signals based on the correcting quantity and the processed useful signal.

3. The apparatus of claim wherein the circuit arrangement includes a first operational amplifier associated with the IR beam receiver for processing the voltage drop at the at least one load resistor into the correcting quantity, and a second operational amplifier in electrical communication with the amplifier having a low-pass characteristic and the first operational amplifier, the processed useful signal and the correcting quantity being supplied to the second operational amplifier, the second operational amplifier by means of the correcting quantity eliminating the variations in the processed useful signal caused by the ambient light and providing a control signal to the microcontroller.

* * * * *

UNITED STATES PATENT AND TRADEMARK OFFICE
CERTIFICATE OF CORRECTION

PATENT NO. : 5,237,249

DATED : August 17, 1993

INVENTOR(S) : Juergen levers

It is certified that error appears in the above-identified patent and that said Letters Patent is hereby corrected as shown below:

Title page, under "References Cited U.S. PATENT DOCUMENTS, delete "4,636,664" and insert --4,636,643-- in its place.

Title page, under "References Cited U.S. PATENT DOCUMENTS, delete "4,956,691" and insert --4,956,591-- in its place.

Column 4, Line 67, immediately after the word "claim", insert --1--.

Signed and Sealed this

Nineteenth Day of April, 1994

Attest:

BRUCE LEHMAN

Attesting Officer

Commissioner of Patents and Trademarks